US012598508B2

(12) United States Patent
Zhang

(10) Patent No.: US 12,598,508 B2
(45) Date of Patent: Apr. 7, 2026

(54) UTILIZING CELLULAR QUALITY OF SERVICE GUARANTEED CHANNELS FOR OVER-THE-TOP APPLICATIONS

(71) Applicant: T-Mobile USA, Inc., Bellevue, WA (US)

(72) Inventor: Lin Zhang, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 344 days.

(21) Appl. No.: 18/362,855

(22) Filed: Jul. 31, 2023

(65) Prior Publication Data

US 2025/0048172 A1     Feb. 6, 2025

(51) Int. Cl.
| | |
|---|---|
| *H04W 28/02* | (2009.01) |
| *H04L 65/1069* | (2022.01) |
| *H04L 65/80* | (2022.01) |
| *H04W 76/10* | (2018.01) |

(52) U.S. Cl.
CPC ..... *H04W 28/0268* (2013.01); *H04L 65/1069* (2013.01); *H04L 65/80* (2013.01); *H04W 28/0257* (2013.01); *H04W 76/10* (2018.02)

(58) Field of Classification Search
CPC ......... H04W 28/0268; H04W 28/0257; H04W 76/10; H04L 65/1069; H04L 65/80; H04L 65/1083; H04L 65/4015
See application file for complete search history.

(56) References Cited

U.S. PATENT DOCUMENTS

| | | |
|---|---|---|
| 2014/0162676 A1 | 6/2014 | Shaw |
| 2019/0254118 A1 | 8/2019 | Dao et al. |
| 2021/0014724 A1* | 1/2021 | Brown .................. H04W 76/12 |
| 2022/0377545 A1 | 11/2022 | Wang et al. |
| 2024/0365360 A1* | 10/2024 | Smith ................. H04W 72/541 |
| 2025/0193721 A1* | 6/2025 | He ......................... H04W 24/08 |

OTHER PUBLICATIONS

"European Search Report Application No. 24189104.3" Mailed Date: Dec. 17, 2024, 9 Pages.

* cited by examiner

*Primary Examiner* — Shawn D Miller
(74) *Attorney, Agent, or Firm* — Foley IP Law, PLLC

(57) ABSTRACT

Solutions are disclosed that utilize cellular quality of service (QOS) guaranteed channels for over-the-top applications (OTAs), and which include: transmitting, by a user equipment (UE), to a wireless network, a first request for a protocol data unit (PDU) session, wherein the first request identifies a default channel; establishing, over the default channel, a real-time video session; transmitting, by the UE, to the wireless network, a second request to modify the PDU session to use a first dedicated channel; establishing the real-time video session over the first dedicated channel; and transmitting, by the UE, real-time video over the first dedicated channel. In some examples, the default channel is a non-guaranteed bitrate (non-GBR) channel, and the first dedicated channel is a GBR channel.

19 Claims, 10 Drawing Sheets

Figure 5:
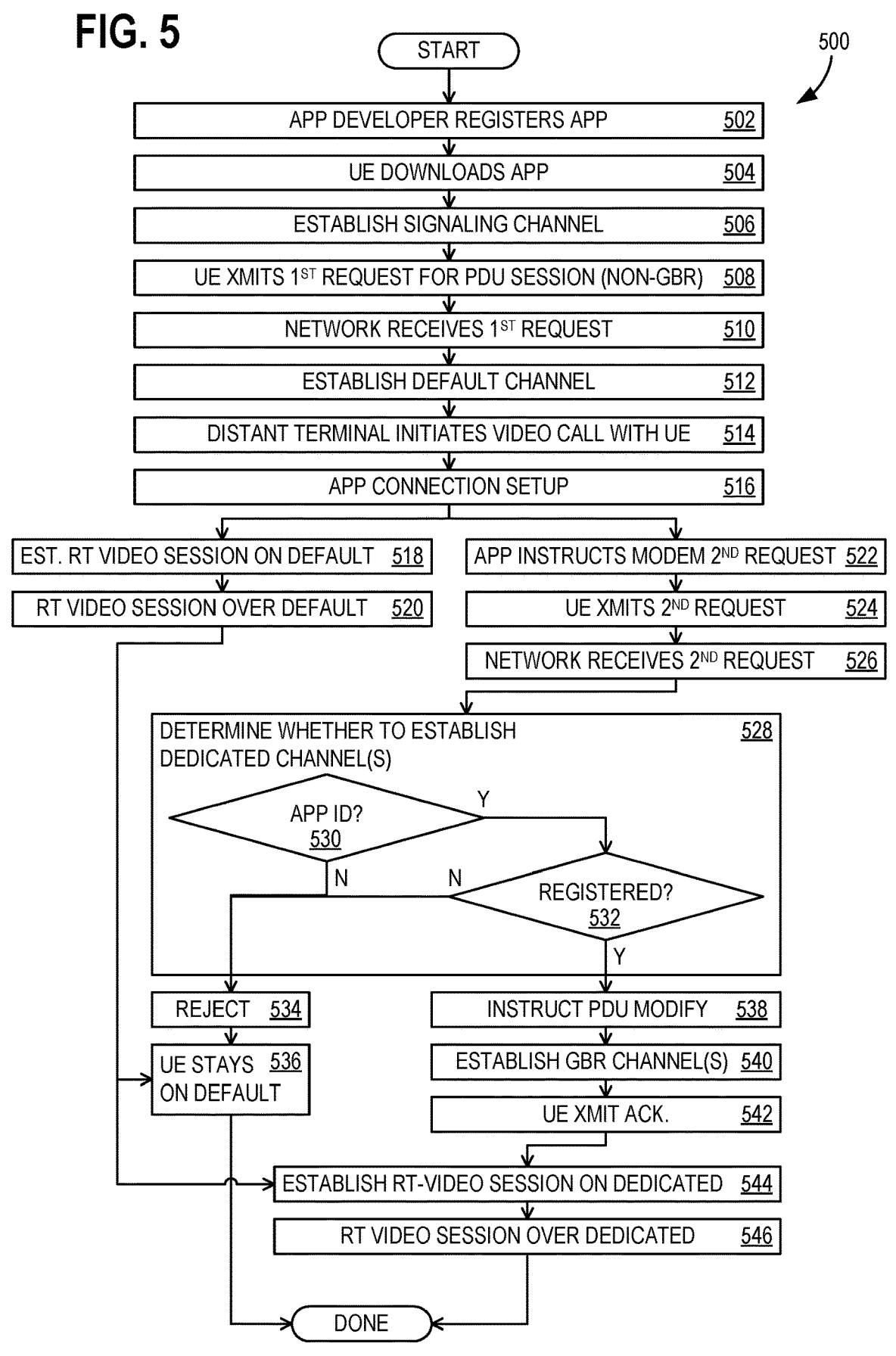

```
                    ( START )
                        │
                        ▼
┌──────────────────────────────────────────────────┐
│  APP DEVELOPER REGISTERS APP              502      │
└──────────────────────────────────────────────────┘
                        │
                        ▼
┌──────────────────────────────────────────────────┐
│  UE DOWNLOADS APP                         504      │
└──────────────────────────────────────────────────┘
                        │
                        ▼
┌──────────────────────────────────────────────────┐
│  ESTABLISH SIGNALING CHANNEL              506      │
└──────────────────────────────────────────────────┘
                        │
                        ▼
┌──────────────────────────────────────────────────┐
│  UE XMITS 1ST REQUEST FOR PDU SESSION (NON-GBR) 508│
└──────────────────────────────────────────────────┘
                        │
                        ▼
┌──────────────────────────────────────────────────┐
│  NETWORK RECEIVES 1ST REQUEST             510      │
└──────────────────────────────────────────────────┘
                        │
                        ▼
┌──────────────────────────────────────────────────┐
│  ESTABLISH DEFAULT CHANNEL                512      │
└──────────────────────────────────────────────────┘
                        │
                        ▼
┌──────────────────────────────────────────────────┐
│  DISTANT TERMINAL INITIATES VIDEO CALL WITH UE 514 │
└──────────────────────────────────────────────────┘
                        │
                        ▼
┌──────────────────────────────────────────────────┐
│  APP CONNECTION SETUP                     516      │
└──────────────────────────────────────────────────┘
```

- EST. RT VIDEO SESSION ON DEFAULT    518
- RT VIDEO SESSION OVER DEFAULT    520

- APP INSTRUCTS MODEM 2ND REQUEST    522
- UE XMITS 2ND REQUEST    524
- NETWORK RECEIVES 2ND REQUEST    526

DETERMINE WHETHER TO ESTABLISH    528
DEDICATED CHANNEL(S)

APP ID?    530 — Y →

N

N    REGISTERED?    532

Y

REJECT    534

INSTRUCT PDU MODIFY    538

UE STAYS    536
ON DEFAULT

ESTABLISH GBR CHANNEL(S)    540

UE XMIT ACK.    542

ESTABLISH RT-VIDEO SESSION ON DEDICATED    544

RT VIDEO SESSION OVER DEDICATED    546

( DONE )

600

START

| OPERATIONS 506-512 OF FLOWCHART 500 | 602 |

| UE MAKES OUTGOING VIDEO CALL WITH APP | 602 |

| TRIGGER PDU SESSION MODIFICATION REQUEST ON VIDEO CALL CONNECTION OR ATTEMPT | 604 |

| FLOWCHART 500 OPERATIONS 516-546 |

| TERMINATE VIDEO CALL | 606 |

| RELEASE GBR CHANNEL(S) | 608 |

DONE

650

START

LAUNCH APP     652

APP CONNECTION SETUP     508

TRIGGER PDU SESSION MODIFICATION     654
REQUEST ON APP LAUNCH

FLOWCHART 500
OPERATIONS 518-546

FLOWCHART 500
OPERATIONS 522-546

SHUT DOWN APP     656

RELEASE SIGNALING CHANNEL     658

DONE

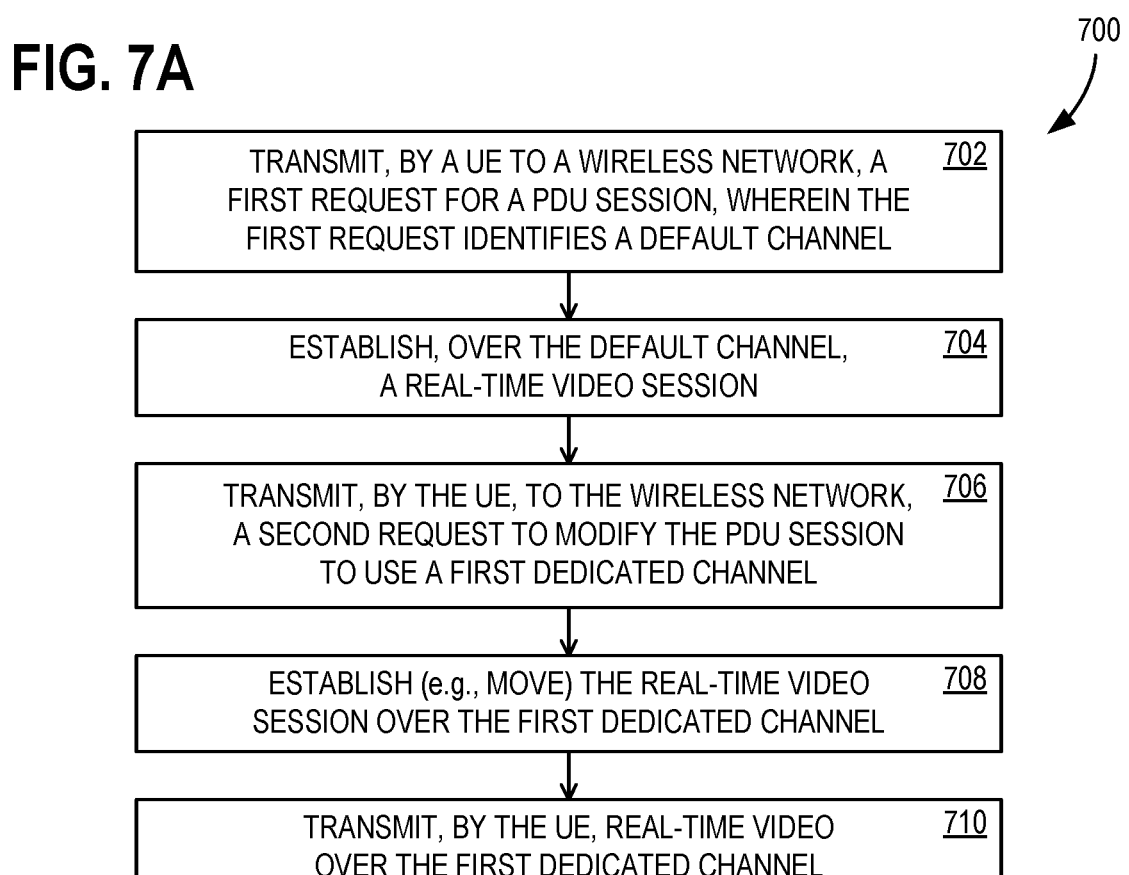

TRANSMIT, BY A UE TO A WIRELESS NETWORK, A
FIRST REQUEST FOR A PDU SESSION, WHEREIN THE
FIRST REQUEST IDENTIFIES A DEFAULT CHANNEL          702

ESTABLISH, OVER THE DEFAULT CHANNEL,
A REAL-TIME VIDEO SESSION          704

TRANSMIT, BY THE UE, TO THE WIRELESS NETWORK,
A SECOND REQUEST TO MODIFY THE PDU SESSION
TO USE A FIRST DEDICATED CHANNEL          706

ESTABLISH (e.g., MOVE) THE REAL-TIME VIDEO
SESSION OVER THE FIRST DEDICATED CHANNEL          708

TRANSMIT, BY THE UE, REAL-TIME VIDEO
OVER THE FIRST DEDICATED CHANNEL          710

FIG. 7B

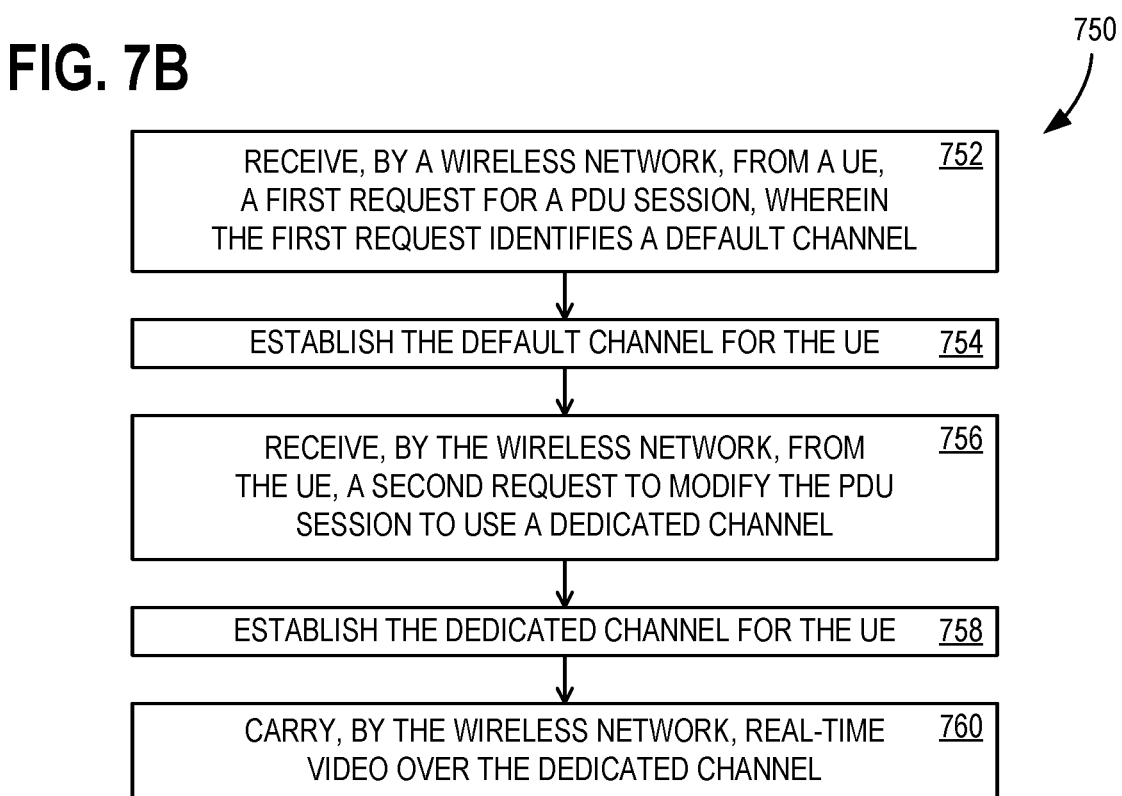

750

RECEIVE, BY A WIRELESS NETWORK, FROM A UE,    752
A FIRST REQUEST FOR A PDU SESSION, WHEREIN
THE FIRST REQUEST IDENTIFIES A DEFAULT CHANNEL

ESTABLISH THE DEFAULT CHANNEL FOR THE UE    754

RECEIVE, BY THE WIRELESS NETWORK, FROM    756
THE UE, A SECOND REQUEST TO MODIFY THE PDU
SESSION TO USE A DEDICATED CHANNEL

ESTABLISH THE DEDICATED CHANNEL FOR THE UE    758

CARRY, BY THE WIRELESS NETWORK, REAL-TIME    760
VIDEO OVER THE DEDICATED CHANNEL

UTILIZING CELLULAR QUALITY OF SERVICE GUARANTEED CHANNELS FOR OVER-THE-TOP APPLICATIONS

BACKGROUND

Native video call services provided by cellular carriers for user equipment (UEs) use dedicated guaranteed bitrate (GBR) data channels, whereas common third-party video call services provided by over-the-top apps (OTAs) use default channels for common internet traffic that are non-GBR (also known as "best effort"). This may result in poorer performance for the third-party video call services, such as choppy video and audio. In some situations, both of the end terminals using a third-party video call service are connected to non-cellular internet service providers (ISPs), although it is increasingly common for end terminals to connect to the internet via a cellular network. Thus, in some scenarios, at least one of the end terminals using a third-party video call service may be connecting to a video call via a cellular network. Additionally, other time-critical services, such as control of an unmanned aerial vehicle (UAV), extended reality (XR), and real-time gaming may suffer from poor performance on "best effort" default channels.

SUMMARY

The following summary is provided to illustrate examples disclosed herein, but is not meant to limit all examples to any particular configuration or sequence of operations.

Solutions are disclosed that utilize cellular quality of service (QOS) guaranteed channels for over-the-top applications (OTAs), and which include: transmitting, by a user equipment (UE), to a wireless network, a first request for a protocol data unit (PDU) session, wherein the first request identifies a default channel: establishing, over the default channel, a real-time video session: transmitting, by the UE, to the wireless network, a second request to modify the PDU session to use a first dedicated channel: establishing the real-time video session over the first dedicated channel; and transmitting, by the UE, real-time video over the first dedicated channel. In some examples, the default channel is a non-guaranteed bitrate (non-GBR) channel, and the first dedicated channel is a GBR channel. In some examples, another over-the top (OTT) service, rather than a video call, may be established over dedicated channels.

Additional solutions include: receiving, by a wireless network, from a UE, a first request for a PDU session, wherein the first request identifies a default channel: establishing the default channel for the UE; receiving, by the wireless network, from the UE, a second request to modify the PDU session to use a dedicated channel: establishing the dedicated channel for the UE; and carrying, by the wireless network, real-time video over the dedicated channel.

BRIEF DESCRIPTION OF THE DRAWINGS

The disclosed examples are described below with reference to the accompanying drawing figures listed below, wherein:

FIGS. 3 and 4 illustrate message sequence diagrams for messages that may occur when using the architecture of FIG. 1:

FIGS. 5, 6A, 6B, 7A and 7B illustrates additional flow-charts of exemplary operations associated with the architecture of FIG. 1.

Figure 1:
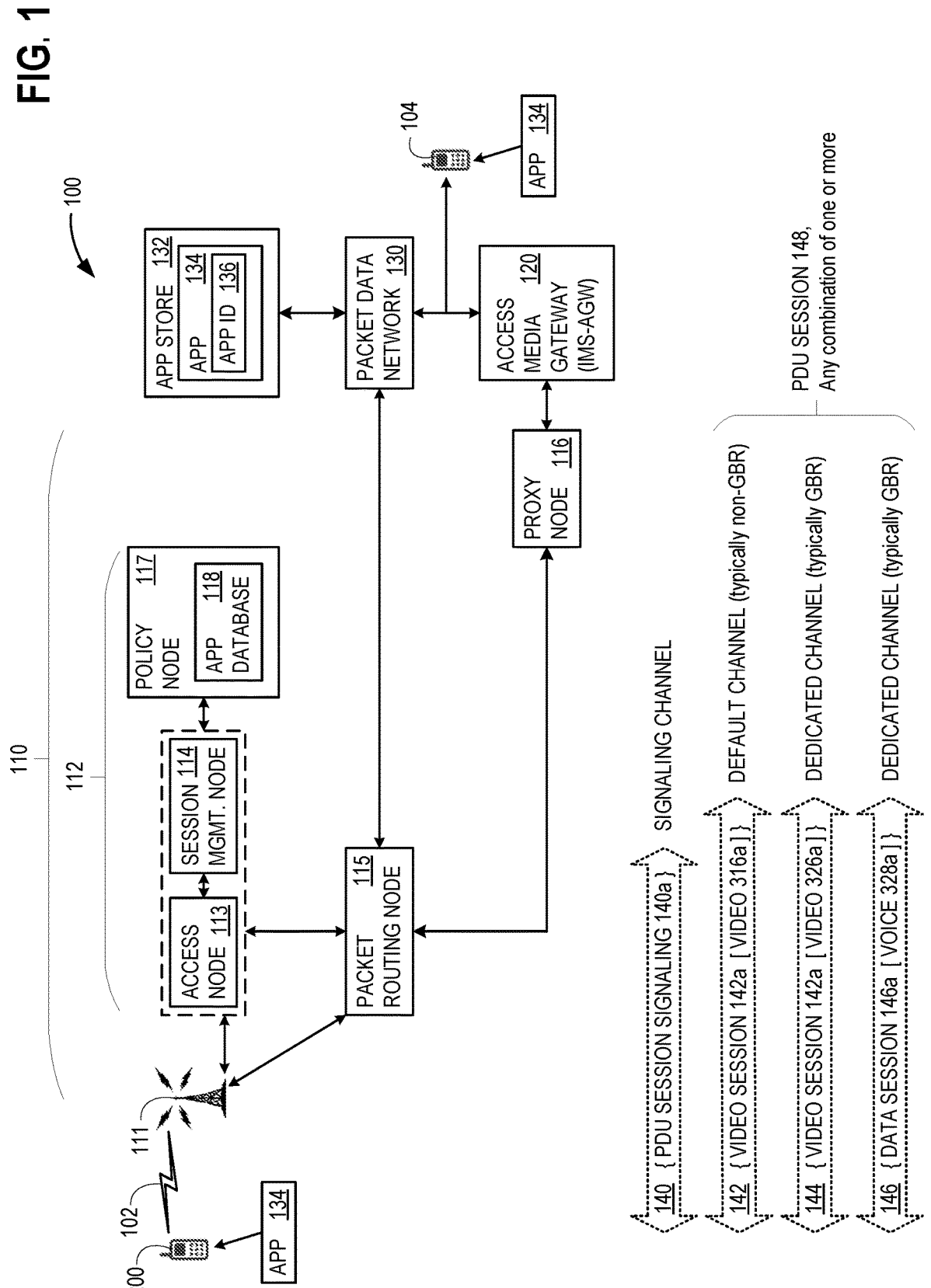
FIG. 1 illustrates an exemplary architecture that advantageously utilize cellular quality of service (QOS) guaranteed channels for over-the-top applications (OTAs)

Corresponding reference characters indicate corresponding parts throughout the drawings. References made throughout this disclosure, relating to specific examples, are provided for illustrative purposes, and are not meant to limit all implementations or to be interpreted as excluding the existence of additional implementations that also incorporate the recited features.

DETAILED DESCRIPTION

Solutions are disclosed that utilize cellular quality of service (QOS) guaranteed channels for over-the-top applications (OTAs), and which include: transmitting, by a user equipment (UE), to a wireless network, a first request for a protocol data unit (PDU) session, wherein the first request identifies a default channel: establishing, over the default channel, a real-time video session; transmitting, by the UE, to the wireless network, a second request to modify the PDU session to use a first dedicated channel; establishing the real-time video session over the first dedicated channel; and transmitting, by the UE, real-time video over the first dedicated channel. In some examples, the default channel is a non-guaranteed bitrate (non-GBR) channel, and the dedicated channel is a GBR channel.

In some examples, non-GBR dedicated channels are used instead, or in addition to GBR dedicated channels. In some examples, another over-the top (OTT) service, rather than a video call, may be established over dedicated channels. Other OTT services include control of an unmanned aerial vehicle (UAV), extended reality (XR), real-time gaming, and others.

Additional solutions include: receiving, by a wireless network, from a UE, a first request for a PDU session, wherein the first request identifies a default channel: establishing the default channel for the UE: receiving, by the wireless network, from the UE, a second request to modify the PDU session to use a dedicated channel: establishing the dedicated channel for the UE; and carrying, by the wireless network, real-time video (or other OTT services) over the dedicated channel.

Aspects of the disclosure improve the performance of third-party video calls and other internet protocol (IP) based real-time video applications that pass over cellular networks, by using a higher-performance dedicated channel in place of a default channel for a PDU session. This is able to reduce the likelihood of choppy video and audio, and drop-outs in critical control signals, such as when a UAV is using a cellular network to extend range for a flight controller. This is accomplished, at least in part, by transmitting, by a UE, to a wireless network, a request to modify a PDU session to use a dedicated channel.

With reference now to the figures, FIG. 1 illustrates an exemplary architecture 100 that advantageously utilizes cellular guaranteed QoS channels (dedicated channels) for over-the-top applications (OTAs). In the scenario depicted in FIG. 1, a UE 200 uses a wireless network 110 to send and/or receive real-time video to/from a distant terminal 104. UE 200 may be a cellular telephone, such as a smartphone, but may also represent other telecommunication devices capable of using a wireless network, such as a personal computer (PC, e.g., desktop, notebook, tablet, extended reality (XR) goggles, etc.) with a cellular modem or using a cellular Wi-Fi hotspot, or another device such as a UAV. Distant terminal may be another UE, a PC, a UAV controller, or another device.

Wireless network 110 may be a cellular network such as a fifth-generation cellular technology (5G) network, a fourth-generation cellular technology (4G) network, or another cellular generation network. In normal cellular operation, UE 200 uses an air interface 102 to communicate with a radio access network (RAN) 111 of wireless network 110. Wireless network 110 has a core network 112 comprising an access node 113, a session management node 114, a packet routing node 115, a proxy node 116, and a policy node 117.

RAN 111 is in communication with access node 113 and packet routing node 115. Access node 113 is in communication with session management node 114 and policy node 117. Packet routing node 115 is in communication with session management node 114, proxy node 116, and an external packet data network 130, such as the internet. In some 5G examples, RAN 111 comprises a gNodeB (gNB), access node 113 comprises an access mobility function (AMF), session management node 114 comprises a session management function (SMF), packet routing node 115 comprises a user plane function (UPF), and policy node 117 comprises a policy control function (PCF).

In some 4G examples, RAN 111 comprises an eNodeB (eNB), access node 113 comprises a mobility management entity (MME), session management node 114 comprises a system architecture evolution gateway (SAEGW) control plane (SAEGW-C), packet routing node 115 comprises an SAEGW-user plane (SAEGW-U), and policy node 117 comprises a policy and charging rules function (PCRF). In some examples, proxy node 116 comprises a proxy call session control function (P-CSCF). In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations.

Proxy node 116 is in communication with an internet protocol (IP) multimedia system (IMS) access gateway (IMS-AGW) 120 within an IMS, in order to provide connectivity to other wireless (cellular) networks or a public switched telephone system (POTS). In some examples, proxy node 116 may be considered to be within the IMS. When a video call or other real-time video session is connected, its data packets will pass through at least RAN 111 and packet routing node 115. Native (cellular carrier-provided) video calls also pass through proxy node 116 and IMS-AGW 120, whereas OTA video calls pass though packet data network 130.

In typical operation, UE 200 and distant terminal 104 each download a software application (app) 134 that has the capability to support video calls, such as two-way and multi-party calls (e.g., video conferencing). UE 200 and distant terminal 104 may download app 134 from an app store 132 (which also represents a developer website for the developer of app 134 or any other facility). App 134 has a unique identifier (ID), app ID 136, that enables other computing equipment, such as components of wireless network 110 to distinguish app 134 from other apps. Wireless network 110 either maintains, or otherwise has access to, an app database 118 which stores app ID 136 as an app that is registered to use one or more dedicated channels. Registration of app 134 permits wireless network 110 to be intelligently selective about which apps requesting a dedicated channel should be granted one or more. In some examples, app ID 136 is defined in a proprietary manner, or some alternative identification scheme (e.g., a hash value associated with app 134) is used instead of app ID 136.

UE 200 requests wireless network 110 to create a signaling channel 140 in order to send and receive signaling necessary for wireless network to create one or more other channels for PDU traffic, such as video, voice, and or other data packets (e.g., UAV flight control data). These data channels are commonly referred to as bearers in 4G and quality of service (QOS) flows in 5G. One or more channels set up for PDU traffic is referred to as a PDU session, so the signaling to set up a PDU session 148 travels over signaling channel 140 and is identified as PDU session signaling 140a. The network end of signaling channel 140 is access node 113, and the network end of data channels is packet routing node 115.

In normal operation, for OTA video calls, app 134 causes UE 200 to request a default channel 142 to send and receive video data packets for real-time video 316a of a real-time video session 142a. Initially, all data traffic is on this same default channel, including voice packets for the audio portion of a video call, or command data packets (e.g., for UAV control), or XR, real-time gaming data, or other data packets. Whereas a video call has parallel video and audio packet streams, UAV control may have parallel video and control signaling, and XR and real-time gaming may also have other data to send and receive in parallel with video.

As described below, however, traffic is moved from default channel 142 to a dedicated channel 144 to send and receive video data packets for real-time video 316a of real-time video session 142a. Additionally, parallel data streams may be moved to another dedicated channel 146 to send and receive packets for voice 328a (or other real-time data) of a real-time data session 146a. For 5G, a non-GBR channel for video may have a 5G Qos Identifier (5QI) value of 6-9, a GBR channel for real-time video may have a 5QI value of 2, and a GBR channel for real-time audio (conversational audio) may have a 5QI value of 1. Other GBR channels may have 5QI values of 3 for real-time gaming, 67 for mission critical video, or 82-86. There may be multiple GBR channels established for different apps or a single app with different services (e.g. 5QI 2 for video, 5QI 1 for audio, 5QI X for gaming . . . ).

Figure 2:
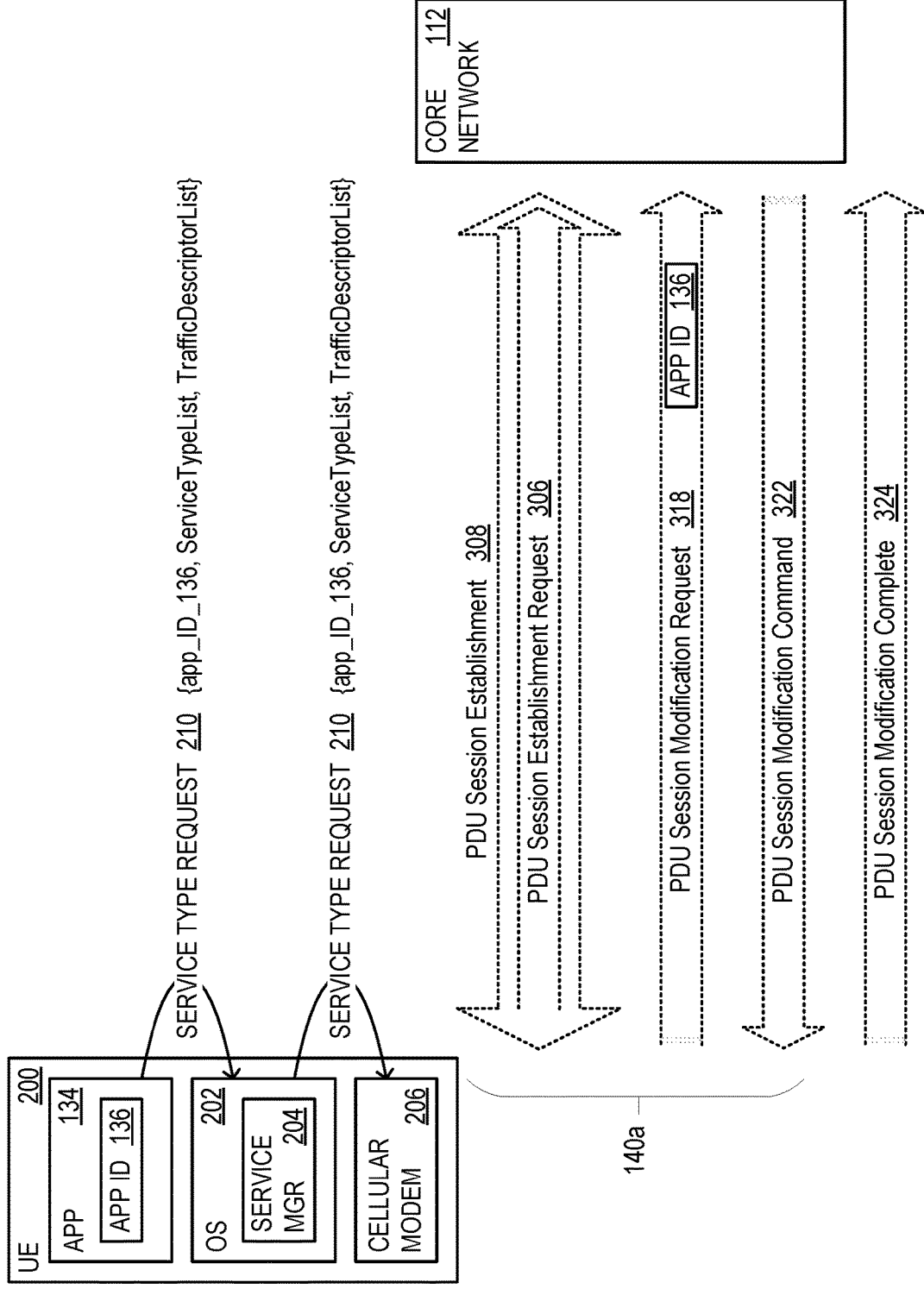
FIG. 2 illustrates further detail for an example user equipment (UE) that may be used within the architecture of FIG. 1.

FIG. 2 illustrates further detail for UE 200 and PDU session signaling 140a. UE 200 has app 134, app ID 136, an operating system (OS) 202, and a cellular modem 206. Cellular modem 206 allocates outgoing data packets to the proper channel (video, audio, or other), and routes incoming data packets to the proper data stream. Cellular modem 206 also communicates with core network 112 of wireless network 110 using PDU session signaling 140a.

PDU session signaling 140a is shown as including a request 306 for PDU session 148, identified as a PDU Session Establishment Request, within PDU Session Establishment 308. In some examples, PDU Session Establishment 308 occurs during power-up of UE 200, when UE 200 registers with wireless network 110. PDU session signaling 140a also includes a request 318 to modify PDU session 148, identified as a PDU Session Modification Request; an instruction 322 for the PDU session modification, identified as a PDU Session Modification Command, and a PDU session modification acknowledgment 324, identified as a PDU Session Modification Complete. PDU Session Establishment Request is a portion of the PDU Session Establishment, as indicated. Each of a PDU Session Establishment Request and a PDU Session Modification Request may include a service type list (ServiceTypeList) and traffic descriptor list (TrafficDescriptrList)

There may be multiple channels in a PDU session, which includes a default channel (typically non-GBR), so the PDU Session Modification Request is to establish one or more dedicated channels (GBR or non-GBR) so that data traffic may be moved from the default channel onto the dedicated channels.

In some examples, PDU session signaling 140*a* is complaint with Third Generation Partnership Project (3GPP) technical standards (TSs), which specify the content and format of such signaling. However, as noted previously, wireless network 110 may limit the apps for which dedicated channels (GBR and/or non-GBR) are provided to only those apps that are registered in app database 118. In such scenarios, UE 200 transmits app ID 136 to wireless network 110. One option is to provide an extra field in a PDU Session Modification Request to hold app ID 136.

Additionally, a mechanism is needed in UE 200 to inform cellular modem 206 of app ID 136 that cellular modem is able to include app ID 136 in request 318. One option is to include a service manager 204 within OS 202, or elsewhere within UE 200. When app 134 instructs cellular modem 206 to request a PDU session modification, app 134 sends an indication 210, shown as a service type request. Other messages may be used, in some examples. In some examples this uses an application programming interface (API) provided by OS 202, specifically service manager 204. Service manager 204 then forwards indication 210 to cellular modem 206. In some examples, service manager 204 encapsulates the content of a service type request from app 134 in another message sent to cellular modem 206.

In the illustrated example, indication 210 includes app ID 136, a service type list that identifies the video, voice, and/or other data service types being requested. TrafficDescriptorList has a set of elements that each defines how to identify specific traffic (e.g., using source and destination IP addresses, ports, etc.) corresponding to the service type in the service type list (ServiceTypeList). Cellular modem 206 maps data of each service types to the proper wireless data channel.

Figure 3:
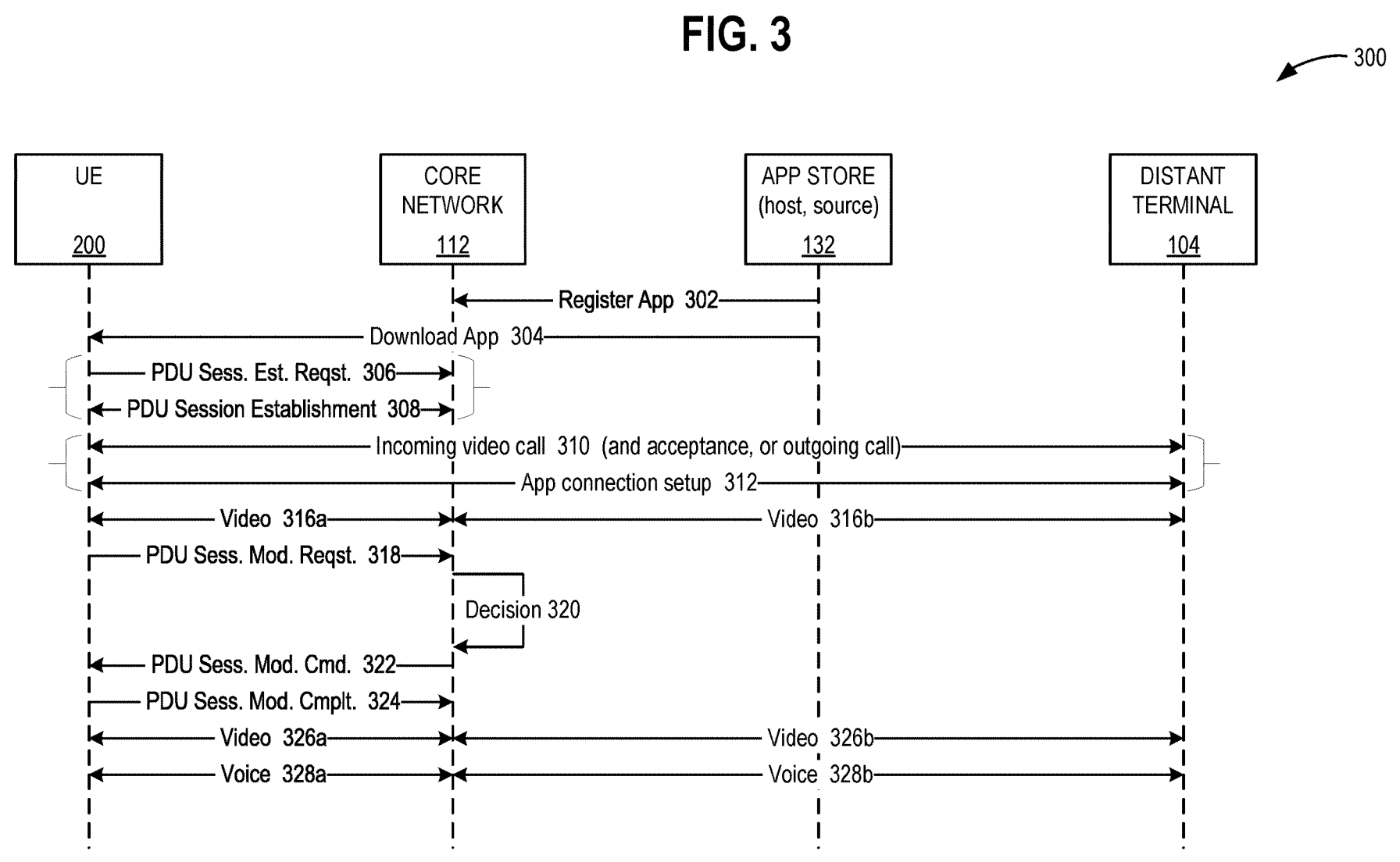
Figure 4:
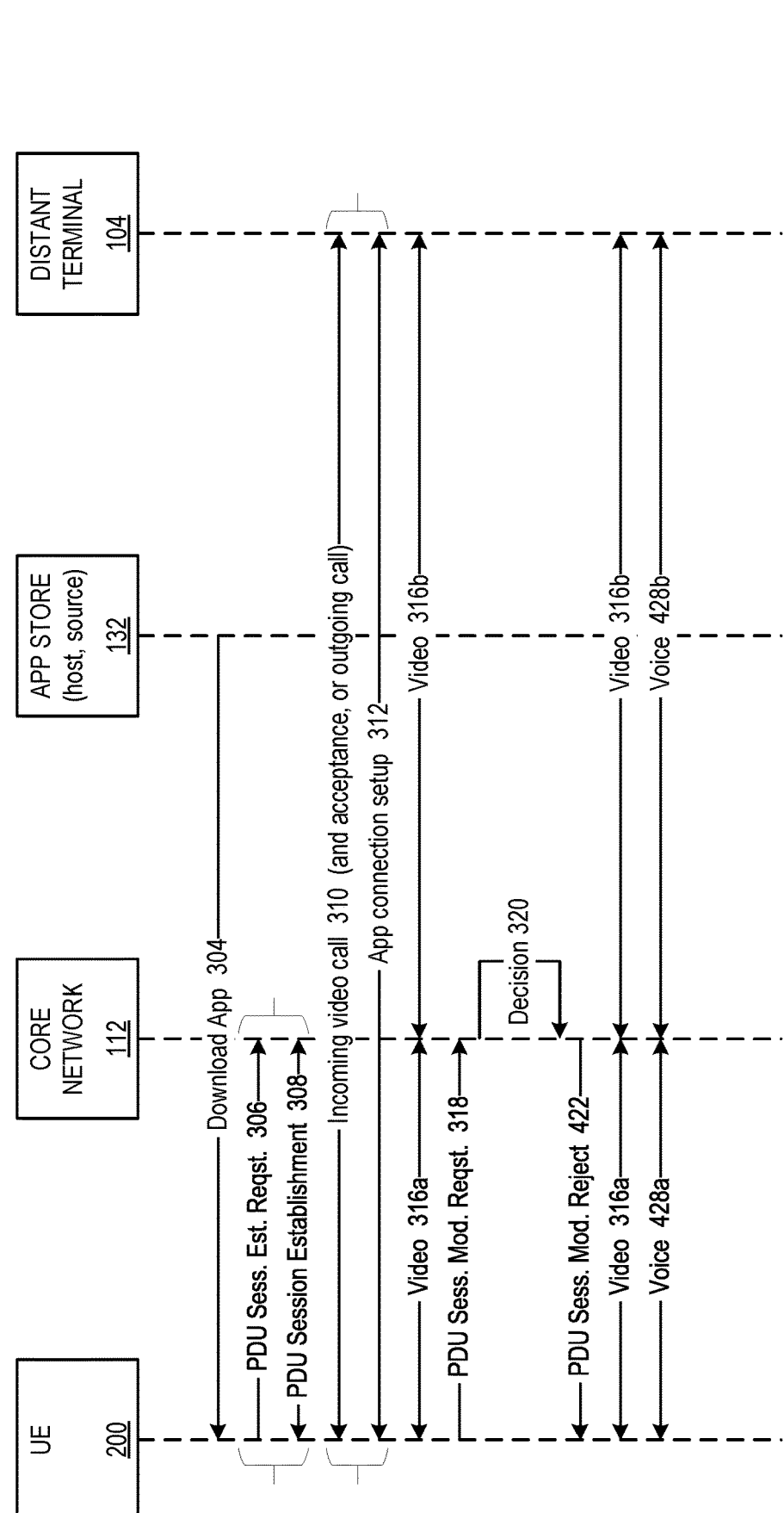

FIG. 3 illustrates a message sequence diagram 300 for messages that may occur when the setup of dedicated channel 144 is successful, and FIG. 4 illustrates a message sequence diagram 400 for messages that may occur when the setup of dedicated channel 144 is not successful because app 134 is not registered in app database 118, or request 318 does not include app ID 136. FIG. 5 illustrates a flowchart 500 of exemplary operations associated with architecture 100. FIG. 5 will be described with reference to the messages of FIGS. 3 and 4, where applicable. In some examples, at least a portion of flowchart 500 may be performed using one or more computing devices 800 of FIG. 8.

Flowchart 500 commences with the developer of app 134 (or other interested party, represented by app store 132) registering app 134 in app database 118 in operation 502. This is also shown as a message 302 in FIG. 3, but is not performed in the messaging scenario shown in FIG. 4. In some examples, the wireless service provider (the operator of wireless network 110) registers app 134 independently from an app store, for example directly with the app vendor.

In operation 504, UE 200 downloads app 134, which is shown as message 304 in FIGS. 3 and 4. From this message 304, through a decision 320 (corresponding to decision operation 528 of flowchart 500), message sequence diagrams 300 and 400, of FIGS. 3 and 4 are identical.

Operation 506 establishes signaling channel 140, which may be non-GBR. This occurs when UE 200 registers with wireless network 110, which often occurs when UE 200 powers up or comes out of airplane mode. In operation 508, UE 200 transmits (a first) request 306 for PDU session 148 to wireless network 110, specifically core network 112 using signaling channel 140. Core network 112 (in general, wireless network 110) receives request 306 in operation 510. Request 306 identifies a default channel, and in some examples, comprises a PDU Session Establishment Request. Request 306 is shown in FIGS. 3 and 4, along with PDU session establishment 308 that represents the remainder of any signaling between UE 200 and core network 112 to set up default channel 142 for UE 200 in operation 516. Request 306 is a portion of PDU session establishment 308. Default channel 142 is established in operation 512.

Distant terminal 104 initiates a video call to UE 200 in operation 514, which is also shown as request 310. In some examples, operation 514 instead involves UE 200 initiating a video call to distant terminal 104. Operation 516 is the setup of app 134 to support the video call, using the proprietary signaling of app 134, which is also shown as a message 312. In some examples, operations 514 and 516 are performed as a single operation, and message 310 is part of the messaging represented by message 312.

In some examples, UE 200 establishes real-time video session 142*a* in operation 518 and transmits real-time video 316*a* (see FIGS. 3 and 4) over default channel 142 in operation 520. The remainder of the path for the video packets, from core network 112 to distant terminal 104 is represented by video 316*b* in FIGS. 3 and 4.

The video call uses default channel 142 prior to the establishment of dedicated channel 144, in some examples, so that UE 200 is not delayed in the start of the video call. In this way, the video call may begin rapidly, with the typical expected performance of OTAs using default channels, and then the performance of the video call is improved when traffic is moved from default channel 142 to dedicated channel 144.

Some examples, however, may delay the start of the video call until dedicated channel 144 is ready, and avoid using default channel 142 for video. This alternative operation, skipping the use of default channel 142 (e.g., skipping operations 518 and 520), may occur when operations 522-532 and 538-544, which establish dedicated channel 144, occur rapidly enough.

Also after operation 516, app 134 indicates to cellular modem 206 to transmit (a second) request 318 to wireless network 110 in operation 522, for example using indication 210. In some examples, indication 210 passes through OS 202 of UE 200, and also in some examples, identifies app 134 using app ID 136. UE 200, using cellular modem 206, transmits request 318 to modify PDU session 148 to use dedicated channel 144 (and also dedicated channel 146, in some examples), in operation 524 In some examples, request 318 comprises a PDU Session Modification Request, as shown in FIGS. 3 and 4. In some examples, request 318 identifies app 134 using app ID 136. That is, operation 524 includes, in some examples, transmitting, by UE 200, to wireless network 110, a PDU Session Modification Request (request 318) comprising an identification of a dedicated channel and an identification of an app on UE 200 that will be using the dedicated channel. Wireless network 110, specifically core network 112, receives request 318 in operation 526.

Decision operation 528 of FIG. 5, which is also shown as decision 320 in FIGS. 3 and 4, determines whether to establish dedicated channel 144 for UE 200. In some examples, decision operation 528 determines whether to establish dedicated channel 144 for UE 200 based on at least the identification of app 134. In an example implementation, decision operation 528 uses two decision operations 530 and 532. In some examples this decision is made at policy node 117.

Decision operation 530 determines whether request 318 identifies app 134 (e.g., includes app ID 136). If not, flowchart 500 moves to operation 534, described below, to reject the request for a dedicated channel. If request 318 does identify app 134, decision operation 532 determines whether app 134 is registered for use of a dedicated channel in wireless network 110. This may be accomplished, in some examples, by identifying whether app ID 136 appears in app database 118. If app 134 is not registered for use of a dedicated channel in wireless network 110, flowchart 500 moves to operation 534 to reject the request for a dedicated channel. Thus, decision operation 528 rejects request 318 based on at least app 134 not being identified in request 318 or (even if identified in request 318) not being registered for use of a dedicated channel in wireless network 110.

Message sequence diagrams 300 and 400 diverge at this point. Message sequence diagram 400 of FIG. 4 shows the rejection scenario in which wireless network 110, determines to not establish dedicated channel 144 for UE 200. In operation 534, based on at least determining to not establish dedicated channel 144 for UE 200, transmitting, by wireless network 110, to UE 200, a PDU session modification reject 422 (shown in FIG. 4, but not in FIG. 3). In operation 536, UE 200 (specifically app 134) continues using default channel 142 for real-time video 316a and voice, which had begun in operation 520. Past core network 112, real-time video 316a and voice continue on to distant terminal 104 as video 316b and voice 428b. In some examples, the real-time data (represented by voice 428a and 428b) comprises mission critical control data, real time gaming data, or XR data. Flowchart 500 is finished for this reject scenario.

Message sequence diagram 300 of FIG. 3 shows the accept scenario in which wireless network 110, determines to establish dedicated channel 144 for UE 200. In operation 538, based on at least determining to establish dedicated channel 144 for UE 200, wireless network 110 transmits a PDU session modification instruction 322 to UE 200. In some examples, instruction 322 comprises a PDU Session Modification Command, as shown in FIG. 3.

Dedicated channel 144 is established, and if used, dedicated channel 146 is also established, in operation 540. In operation 542, based on at least receiving instruction 322, UE 200 transmits a PDU session modification acknowledgment 324 to wireless network 110. In some examples, acknowledgment 324 comprises a PDU Session Modification Complete, as shown in FIG. 3. Default channel 142 and signaling channel 140 remain active.

In operation 544, UE 200 moves real-time video session 142a to dedicated channel 144 (establishes real-time video session 142a on dedicated channel 144) and, in some examples, also establishes real-time data session 146a for parallel data on dedicated channel 146 (e.g., to carry voice in parallel with video). That is, whether real-time video session 142a is newly begun on dedicated channel 144 (i.e., had not been earlier established on default channel 142), or moved over from default channel 142, operation 544 establishes real-time video session 142a on dedicated channel 144. In some cases, operation 520 (the use of default channel

142) had remained ongoing throughout operations 522-532 and 538-542. However, in some examples, if operations 522-532 and 538-542 had been sufficiently quick operations 518 and 520 are skipped.

In operation 546, UE 200 transmits real-time video 326a over dedicated channel 144 and voice 328a (or other real-time data) over dedicated channel 146. Also in operation 546, wireless network 110 carries real-time video 326a over dedicated channel 144 and voice 328a over dedicated channel 146. As shown in FIG. 3, past core network 112, real-time video 326a and voice 328a continue on to distant terminal 104 as video 326b and voice 328b. In some examples, the real-time data (represented by voice 328a and 328b) comprises mission critical control data, real time gaming data, or XR data. Flowchart 500 is finished for this dedicated channel acceptance scenario.

Figure 6A:
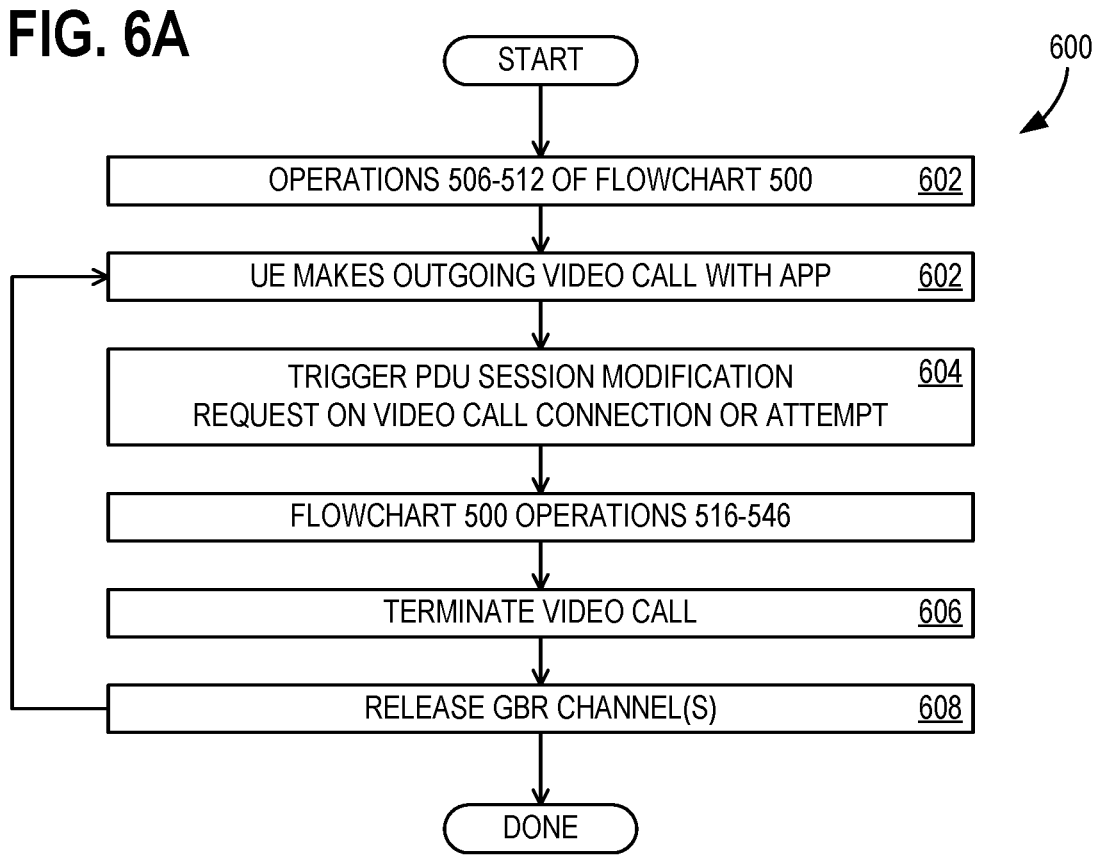

FIG. 6A illustrates a flowchart 600 for a different scenario, in which UE 200 comprises a cellular telephone or PC and places an outgoing video call to distant terminal 104. The scenario illustrated in FIG. 6 may be referred to as an on-demand PDU session modification. In some examples, at least a portion of flowchart 600 may be performed using one or more computing devices 800 of FIG. 8. Flowchart 600 commences with operations 506-512 of flowchart 500.

Figure 6B:
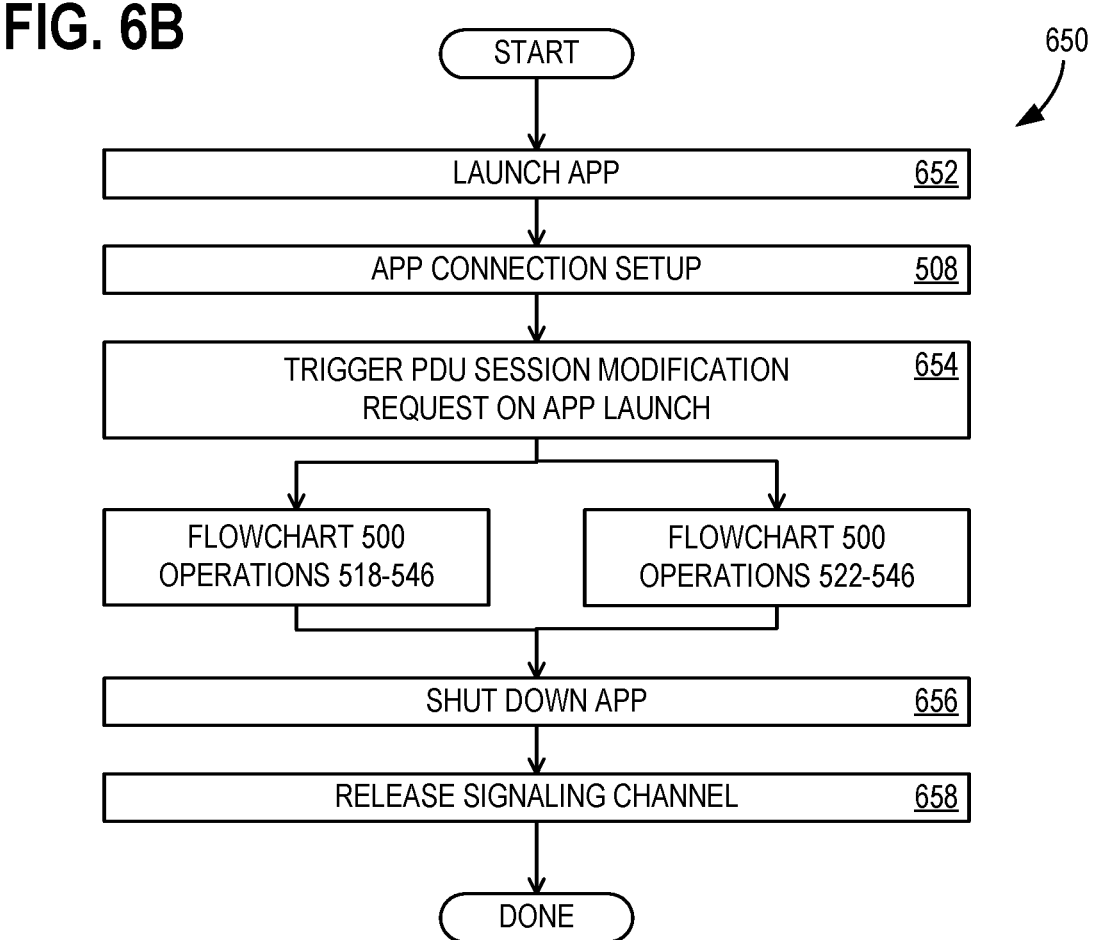

UE 200 initiates an outgoing video call in operation 602. In this on-demand scenario, request 318 is triggered, in operation 604, on the attempt to connect to (or make) a video call. Operations 516-546 of flowchart 500 are performed. The video call is terminated in operation 606, and based on at least completion of the video call, operation 608 releases dedicated channel 144 (and dedicated channel 146, if used), but retains signaling channel 140. Flowchart 600 then returns to operation 602 to permit UE 200 to make or receive another video call, FIG. 6B illustrates a flowchart 650 for another different scenario, in which UE 200 comprises a UAV. The scenario illustrated in FIG. 6B may be referred to as an all-in-one scenario, because signaling channel 140 and (PDU session modification) request 318 are both triggered by launching app 134, and signaling channel 140 and dedicated channel 144 are released together when shutting down app 134. In some scenarios, for some types of UE 200, app 134 is launched and shut down automatically upon power up and power down. In some examples, at least a portion of flowchart 650 may be performed using one or more computing devices 800 of FIG. 8.

Flowchart 650 commences with launching app 134 on UE 200 in operation 652. In some scenarios, such as some scenarios when UE 200 comprises a UAV, app 134 is automatically launched upon device power-up. In this all-in-one scenario, request 318 is triggered, in operation 654, on the launch of app 134. In some examples, operations 518-546 of flowchart 500 are performed. In other examples, however, the real-time video and other real-time data are delayed until dedicated channels 144 and 146 are set up. In such examples, operations 522-548 of flowchart 500 are performed and operation 520 of flowchart 500 is skipped.

App 134 is shut down in operation 656. Based on at least app 134 being shut down (and therefore no longer requiring dedicated channel 144), operation 658 releases both dedicated channel 144 (and also dedicated channel 146, if used), and also releases signaling channel 140.

For the all-in-one scenario, dedicated channels are brought up together with the start-up of app 134 (e.g., the start-up of a UAV when the on-board software launches). The app start-up is the trigger for the dedicated channels for video (GBR) and critical control (typically non-GBR), and the dedicated channels are released when the UAV is powered down. This contrasts with the on-demand scenario described previously, in which the dedicated channels are brought up after app 134 is already executing. The launch of app 134 does not trigger the dedicated channels. Rather, the dedicated channels are triggered when a call is placed (outgoing or incoming), and they are released when the call ends. However, in both scenarios, the default channel is present.

FIG. 7A illustrates a flowchart 700 of exemplary operations associated with examples of architecture 100. In some examples, at least a portion of flowchart 700 may be performed using one or more computing devices 800 of FIG. 8. Flowchart 700 commences with operation 702, which includes transmitting, by a UE, to a wireless network, a first request for a PDU session, wherein the first request identifies a default channel.

Operation 704 includes establishing, over the default channel, a real-time video session. Operation 706 includes transmitting, by the UE, to the wireless network, a second request to modify the PDU session to use a first dedicated channel. Operation 708 includes establishing the real-time video session over the first dedicated channel. Operation 710 includes transmitting, by the UE, real-time video over the first dedicated channel.

FIG. 7B illustrates a flowchart 750 of exemplary operations associated with examples of architecture 100. In some examples, at least a portion of flowchart 750 may be performed using one or more computing devices 800 of FIG. 8. Flowchart 750 commences with operation 752, which includes receiving, by a wireless network, from a UE, a first request for a PDU session, wherein the first request identifies a default channel.

Operation 754 includes establishing the default channel for the UE. Operation 756 includes receiving, by the wireless network, from the UE, a second request to modify the PDU session to use a first dedicated channel. Operation 758 includes establishing the first dedicated channel for the UE. Operation 760 includes carrying, by the wireless network, real-time video over the first dedicated channel.

Figure 8:
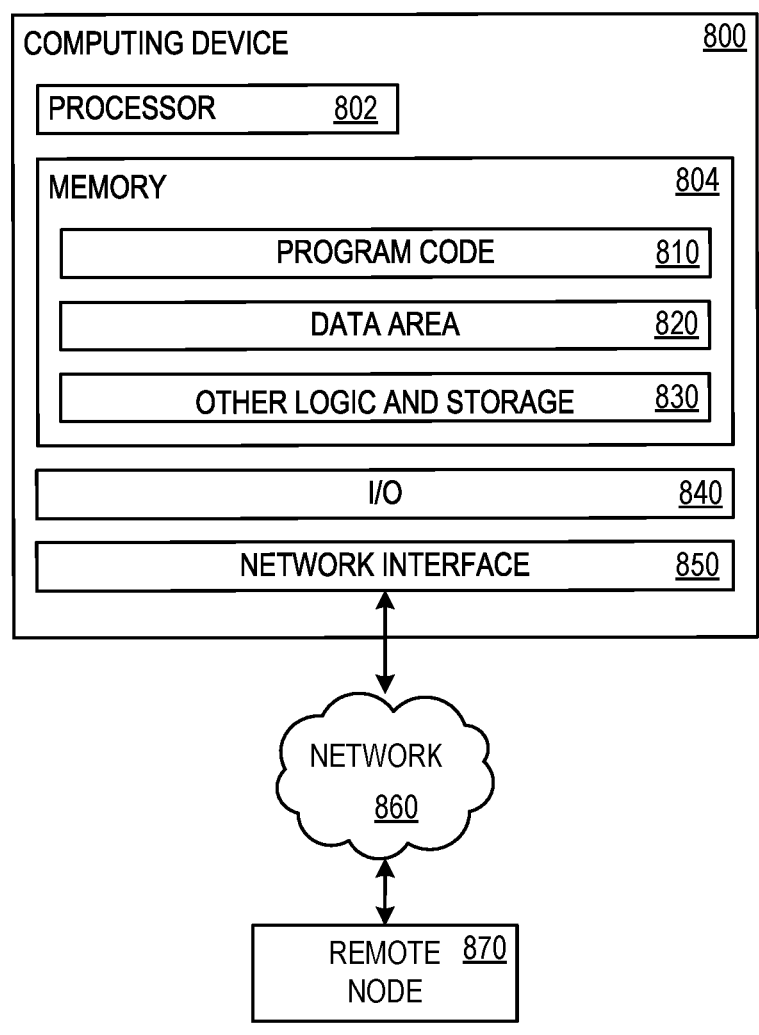
FIG. 8 illustrates a block diagram of a computing device suitable for implementing various aspects of the disclosure.

FIG. 8 illustrates a block diagram of computing device 800 that may be used as any component described herein that may require computational or storage capacity. Computing device 800 has at least a processor 802 and a memory 804 that holds program code 810, data area 820, and other logic and storage 830. Memory 804 is any device allowing information, such as computer executable instructions and/or other data, to be stored and retrieved. For example, memory 804 may include one or more random access memory (RAM) modules, flash memory modules, hard disks, solid-state disks, persistent memory devices, and/or optical disks. Program code 810 comprises computer executable instructions and computer executable components including instructions used to perform operations described herein. Data area 820 holds data used to perform operations described herein. Memory 804 also includes other logic and storage 830 that performs or facilitates other functions disclosed herein or otherwise required of computing device 800. An input/output (I/O) component 840 facilitates receiving input from users and other devices and generating displays for users and outputs for other devices. A network interface 850 permits communication over external network 860 with a remote node 870, which may represent another implementation of computing device 800.

For example, a remote node 870 may represent another of the above-noted nodes within architecture 100.

ADDITIONAL EXAMPLES

An example system comprises: a processor; and a computer-readable medium storing instructions that are operative upon execution by the processor to: transmit, by a UE to a wireless network, a first request for a PDU session, wherein the first request identifies a default channel; establish, over the default channel, a real-time video session; transmit, by the UE, to the wireless network, a second request to modify the PDU session to use a first dedicated channel: establish the real-time video session over the first dedicated channel; and transmit, by the UE, real-time video over the first dedicated channel.

Another example system comprises: a processor; and a computer-readable medium storing instructions that are operative upon execution by the processor to: receive, by a wireless network, from a UE, a first request for a PDU session, wherein the first request identifies a default channel; establish the default channel for the UE; receive, by the wireless network, from the UE, a second request to modify the PDU session to use a first dedicated channel: establish the first dedicated channel for the UE; and carry, by the wireless network, real-time video over the first dedicated channel.

An example method of wireless communication comprises: transmitting, by a UE, to a wireless network, a first request for a PDU session, wherein the first request identifies a default channel: establishing, over the default channel, a real-time video session; transmitting, by the UE, to the wireless network, a second request to modify the PDU session to use a first dedicated channel: establishing the real-time video session over the first dedicated channel; and transmitting, by the UE, real-time video over the first dedicated channel.

Another example method of wireless communication comprises: receiving, by a wireless network, from a UE, a first request for a PDU session, wherein the first request identifies a default channel: establishing the default channel for the UE: receiving, by the wireless network, from the UE, a second request to modify the PDU session to use a first dedicated channel: establishing the first dedicated channel for the UE; and carrying, by the wireless network, real-time video over the first dedicated channel.

Another method of wireless communication comprises: transmitting, by UE, to a wireless network, a PDU Session Modification Request comprising an identification of a first dedicated channel and an identification of an app on the UE that will be using the first dedicated channel.

One or more example computer storage devices has computer-executable instructions stored thereon, which, upon execution by a computer, cause the computer to perform operations comprising: transmitting, by a UE, to a wireless network, a first request for a PDU session, wherein the first request identifies a default channel: based on at least receiving an instruction for a PDU session modification, establishing, over the default channel, a real-time video session; transmitting, by the UE, to the wireless network, a second request to modify the PDU session to use a first dedicated channel, wherein the second request identifies an app on the UE that will be using the first dedicated channel: establishing the real-time video session over the first dedicated channel; and transmitting, by the UE, real-time video over the first dedicated channel.

One or more example computer storage devices has computer-executable instructions stored thereon, which, upon execution by a computer, cause the computer to perform operations comprising: receiving, by a wireless network, from a UE, a first request for a PDU session, wherein the first request identifies a default channel; establishing the default channel for the UE; receiving, by the wireless network, from the UE, a second request to modify the PDU session to use a first dedicated channel: establishing the first dedicated channel for the UE; and carrying, by the wireless network, real-time video over the first dedicated channel.

Alternatively, or in addition to the other examples described herein, examples include any combination of the following:

based on at least receiving an instruction for a PDU session modification, transmitting, by the UE, to the wireless network, a PDU session modification acknowledgment;

establishing the real-time video session over the first dedicated channel comprises establishing the real-time video session over the first dedicated channel based on at least receiving the instruction for the PDU session modification;

establishing, for the UE, a second dedicated channel;

transmitting, by the UE, real-time voice, mission critical control data, real time gaming data, or XR data over the second dedicated channel;

the second request identifies an app on the UE that will be using the first dedicated channel;

indicating, by an app on the UE that will be using the first dedicated channel, to a cellular modem of the UE, to transmit the second request to the wireless network;

the indication by the app to the cellular modem passes through an OS of the UE;

the indication by the app to the cellular modem identifies the app;

establishing a signaling channel;

triggering the second request on an attempt to connect to a video call;

based on at least completion of the video call, releasing the first dedicated channel and retaining the signaling channel;

triggering the second request on launching an app on the UE that will be using the first dedicated channel;

based on at least the app no longer requiring the first dedicated channel, releasing both the first dedicated channel and a signaling channel;

the UE comprises a cellular telephone;

the UE comprises a UAV;

the wireless network comprises a cellular network;

the first request comprises a PDU Session Establishment Request;

the default channel comprises a 4G bearer;

the default channel comprises a 5G QoS flow;

the default channel has a 5QI value of 6 through 9;

the second request comprises a PDU Session Modification Request;

the second request identifies the first dedicated channel in a TrafficDescriptorList field;

the second request identifies the second dedicated channel in the TrafficDescriptorList field;

the first dedicated channel comprises a 4G bearer;

the second dedicated channel comprises a 4G bearer;

the first dedicated channel comprises a 5G QoS flow;

the first dedicated channel has a 5QI value of 2;

the second dedicated channel comprises a 5G QoS flow;

the second dedicated channel has a 5QI value of 1;

the second dedicated channel has a 5QI value of 3 or above 80;

the first dedicated channel comprises a 5G QoS flow with a 5QI value of 2;

receiving, by a wireless network, from a UE, a first request for a PDU session, wherein the first request identifies a default channel;

establishing the default channel for the UE;

receiving, by the wireless network, from the UE, a second request to modify the PDU session to use a first dedicated channel;

establishing the first dedicated channel for the UE;

carrying, by the wireless network, real-time video over the first dedicated channel;

prior to the establishment of the first dedicated channel for the UE, transmitting, by the UE, real-time video over the default channel;

prior to the establishment of the first dedicated channel for the UE, carrying, by the wireless network, real-time video over the default channel;

determining whether to establish the first dedicated channel for the UE;

based on at least determining to establish the first dedicated channel for the UE, transmitting, by the wireless network, to the UE, a PDU session modification instruction;

the instruction for the PDU session modification comprises a PDU Session Modification Command;

carrying, by the wireless network, real-time voice, mission critical control data, real time gaming data, or XR data over the second dedicated channel;

determining whether to establish the first dedicated channel for the UE comprises determining whether to establish the first dedicated channel for the UE based on at least the identification of the app on the UE that will be using the first dedicated channel;

determining whether to establish the first dedicated channel for the UE comprises determining whether the second request identifies the app on the UE that will be using the first dedicated channel;

determining whether to establish the first dedicated channel for the UE comprises determining whether the app on the UE is registered for use of a first dedicated channel in the wireless network; and based on at least the app on the UE not being identified in the second request or not being registered for use of a first dedicated channel in the wireless network, determining to not establish the first dedicated channel for the UE.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:
    transmitting, by a user equipment (UE), a protocol data unit (PDU) session establishment request to a wireless network operated by a cellular service provider, the PDU session establishment request requesting establishment of a PDU session to communicate a real-time video call of a non-cellular service provider over a non-guaranteed bitrate (non-GBR) channel;
    communicating the real-time video call of the non-cellular service provider over the non-GBR channel in response to acknowledgement of the PDU session establishment request;
    transmitting, by the UE, a PDU session modification request to the wireless network, the PDU session modification request requesting modification of the PDU session to use a guaranteed bitrate (GBR) channel for the real-time video call of the non-cellular service provider; and
    communicating the real-time video call of the non-cellular service provider over the GBR channel in response to acknowledgement of the PDU session modification request.

2. The method of claim 1, wherein the real-time video call is a real time gaming data.

3. The method of claim 1, wherein the real-time video call is an extended reality (XR) data call.

4. The method of claim 1, wherein the PDU session modification request is transmitted in response to launching an application (app) on the UE that will be using the GBR channel.

5. The method of claim 4, further comprising:
    sending, from the app, an indication to a cellular modem of the UE, the indication indicating that the app will be using the GBR channel, wherein the indication prompts the cellular modem of the UE to transmit the PDU session modification request to the wireless network.

6. The method of claim 5, wherein the indication passes through an operating system (OS) of the UE.

7. The method of claim 1, further comprising:
    establishing a signaling channel; and
    releasing the GBR channel based on at least completion of the real-time video call, wherein the signaling channel is retained after releasing the GBR channel.

8. The method of claim 7, wherein the non-GBR channel is retained after releasing the GBR channel.

9. The method of claim 1, wherein the GBR channel is associated with a 5G QoS Identifier (5QI) value of 2.

10. The method of claim 1, wherein the GBR channel is associated with a 5G QoS Identifier (5QI) value of 3.

11. The method of claim 1, wherein the non-GBR channel is associated with a 5G QOS Identifier (5QI) value between 6 and 9.

12. The method of claim 11, wherein the GBR channel is associated with a 5G QoS Identifier (5QI) value of 67 to indicate that the real-time video call is mission critical video.

13. The method of claim 1, wherein the real-time video call of the non-cellular service provider is an over-the-top application (OTA) video call carrying unmanned aerial vehicle (UAV) flight control data.

14. A method of wireless communication, the method comprising:
    transmitting, by a user equipment (UE), to a wireless network, a first request for a protocol data unit (PDU) session, wherein the first request identifies a default channel; establishing, over the default channel, a real-time video session;
    establishing a signaling channel;
    transmitting, by the UE, to the wireless network, a second request to modify the PDU session to use a first dedicated channel, the second request triggered in response to an attempt to connect to a video call;
    establishing the real-time video session over the first dedicated channel;
    transmitting, by the UE, real-time video over the first dedicated channel; and
    based on at least completion of the video call, releasing the first dedicated channel and retaining the signaling channel.

15. A method of wireless communication, the method comprising:
    transmitting, by a user equipment (UE), to a wireless network, a first request for a protocol data unit (PDU) session, wherein the first request identifies a default channel; establishing, over the default channel, a real-time video session;
    transmitting, by the UE, to the wireless network, a second request to modify the PDU session to use a first dedicated channel, the second request triggered in response to launching an application (app) on the UE that will be using the first dedicated channel;
    establishing the real-time video session over the first dedicated channel;
    transmitting, by the UE, real-time video over the first dedicated channel; and
    based on at least the app no longer requiring the first dedicated channel, releasing both the first dedicated channel and a signaling channel.

16. The method of claim 15, wherein the second request identifies the app.

17. The method of claim 15, further comprising:
    sending, from the app, an indication to a cellular modem of the UE, the indication indicating that the app will be using the first dedicated channel, wherein the indication prompts the cellular modem of the UE to transmit the second request to the wireless network.

18. The method of claim 17, wherein the indication passes through an operating system (OS) of the UE.

19. The method of claim 17, wherein the indication by the app to the cellular modem identifies the app.

* * * * *